US012151469B2

(12) United States Patent
Hirata

(10) Patent No.: US 12,151,469 B2
(45) Date of Patent: Nov. 26, 2024

(54) IMAGE FORMING APPARATUS

(71) Applicant: Konica Minolta, Inc., Tokyo (JP)

(72) Inventor: Daiki Hirata, Aichi (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/387,414

(22) Filed: Jul. 28, 2021

(65) Prior Publication Data

US 2022/0032665 A1 Feb. 3, 2022

(30) Foreign Application Priority Data

Jul. 29, 2020 (JP) ................................ 2020-128381

(51) Int. Cl.
*B41J 13/26* (2006.01)

(52) U.S. Cl.
CPC .................................... *B41J 13/26* (2013.01)

(58) Field of Classification Search
CPC . G03G 15/5058; G03G 15/5062; B41J 13/26; B65H 9/20; B65H 2551/61; B65H 2557/61
See application file for complete search history.

(56) References Cited

U.S. PATENT DOCUMENTS 10,477,075 B2 * 11/2019 Sakatani ................ H04N 1/603
2012/0050771 A1 * 3/2012 Sakatani ............ H04N 1/00015 358/1.9
2017/0131671 A1 * 5/2017 Nishimura ......... G03G 15/5062
2019/0170078 A1 * 6/2019 Nishimura ............ H01F 7/1805
2019/0193440 A1 * 6/2019 Sugata ................... B41J 29/393
2020/0099812 A1 * 3/2020 Ishii ......................... B65H 7/14
2020/0292977 A1 * 9/2020 Sato ..................... G03G 15/234

FOREIGN PATENT DOCUMENTS

JP 2000305324 A 11/2000
JP 2016025446 A * 2/2016
JP 2019115996 A 7/2019

OTHER PUBLICATIONS

JPO Notice of Reasons for Refusal for corresponding JP Application No. 2020-128381; Issued Mar. 5, 2024; 10 pages.

* cited by examiner

*Primary Examiner* — Jennifer Bahls
(74) *Attorney, Agent, or Firm* — CANTOR COLBURN LLP

(57) ABSTRACT

An image forming apparatus includes an image former that forms a plurality of adjustment images on a sheet. The plurality of adjustment images are used for adjusting a forming position of a printing image to be formed on the sheet. The plurality of adjustment images are formed at positions that are asymmetrical with respect to the center of the sheet or the center of the printing image.

10 Claims, 5 Drawing Sheets

<Prior Art>

IMAGE FORMING APPARATUS

CROSS-REFERENCE TO RELATED APPLICATIONS

The present invention claims priority under 35 U.S.C. § 119 to Japanese Patent Application No. 2020-128381, filed on Jul. 29, 2020, the entire content of which is incorporated herein by reference.

BACKGROUND

Technological Field

The present invention relates to an image forming apparatus.

Description of Related Art

Severe standards or conditions for alignment of images formed on sheets are set, in some cases, for image forming apparatuses that form images on sheets as recording media. To adjust an image forming position in this case, adjustment images are formed on four corners of the sheet, and the formed adjustment images are read by an image reading apparatus such as a Contact Image Sensor (CIS). The distance between the sheet end and such an adjustment image is specified in advance (the specified distance), and misalignment of the formed adjustment image can be determined by comparing the specified distance and the distance between the sheet end and the adjustment image read by the image reading apparatus (the measurement distance). The image can be thus aligned by changing image forming conditions (e.g., image forming timings) and correcting the image forming position, according to the difference between the specified distance and the determined measurement distance (See, for example, Japanese Patent Application Laid-Open No. 2000-305324).

The alignment method of the image forming apparatus described above, however, is based on a condition where the image reading apparatus is wider than the sheet in a direction of the width of the sheet, for example. Forming the adjustment images on the four corners of the sheet causes the image reading apparatus to fail to read part of the adjustment images, for example, in a case where the image reading apparatus is narrower than the sheet. In addition, the adjustment images cannot be formed on the four corners of the sheet in some cases due to a restriction on the image forming conditions for the image to be formed on the sheet, depending on requests of users, for example. It is thus expected to adjust the image forming position more flexibly by reading the adjustment images regardless of such restrictions on the width of the image reading apparatus and on the image forming conditions.

SUMMARY

An object of the present invention is to provide an image forming apparatus capable of adjusting an image forming position more flexibly.

To achieve at least one of the above-mentioned objects, according to an aspect of the present invention, an image forming apparatus reflecting one aspect of the present invention is an apparatus, including an image former that forms a plurality of adjustment images on a sheet. The plurality of adjustment images are used for adjusting a forming position of a printing image to be formed on the sheet. The plurality of adjustment images are formed at positions that are asymmetrical with respect to a center of the sheet or a center of the printing image.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

An embodiment of the present invention will be described in detail below with reference to the accompanying drawings.

Figure 1:
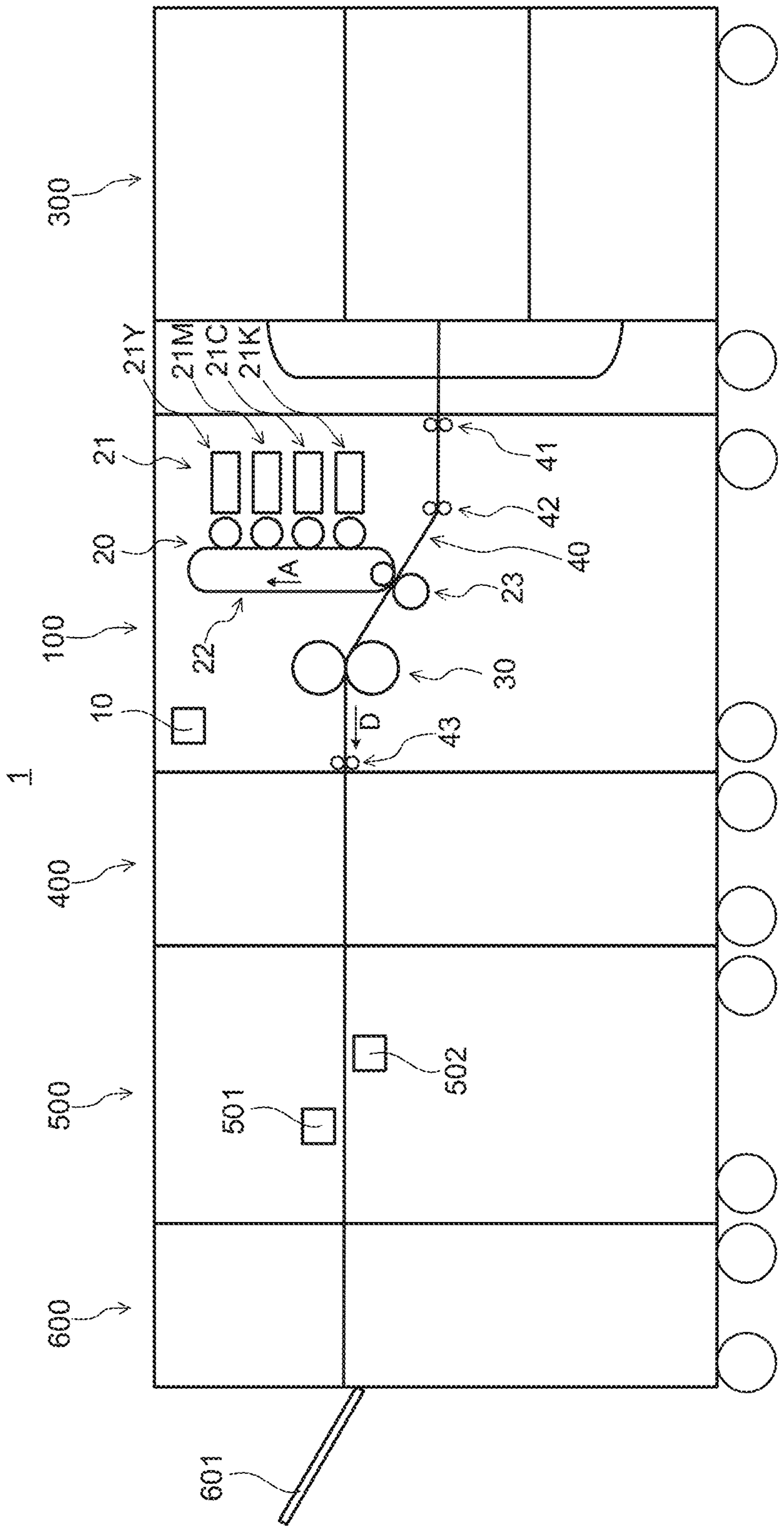
FIG. 1 is a diagram schematically illustrating an entire configuration of an image forming apparatus according to an embodiment of the present invention.
Figure 2:
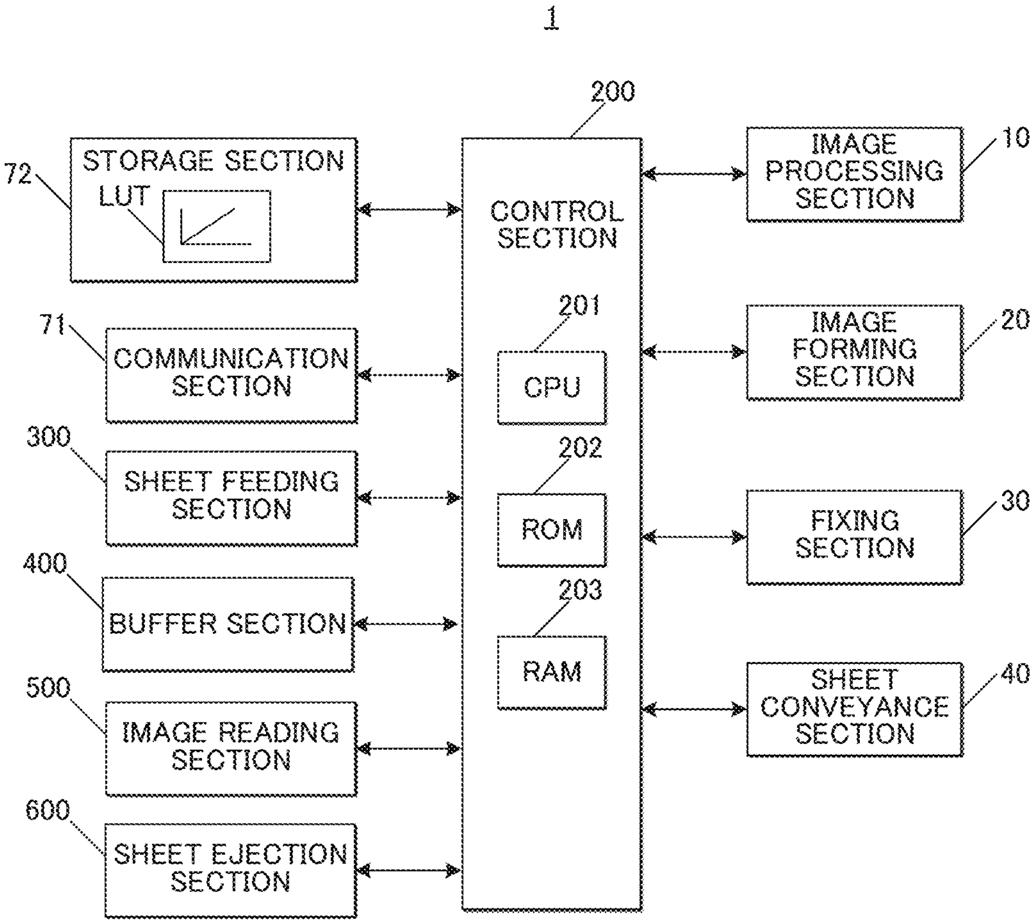
FIG. 2 is a block diagram illustrating main sections of a control system of the image forming apparatus according to the embodiment of the present invention.

FIG. 1 is a diagram schematically illustrating an entire configuration of image forming apparatus 1 according to the present embodiment. FIG. 2 is a block diagram illustrating main sections of a control system of image forming apparatus 1 according to the present embodiment.

Image forming apparatus 1 is an apparatus capable of forming images on sheets (recording media). Image forming apparatus 1 includes image forming apparatus body 100, sheet feeding section 300, buffer section 400, image reading section 500, and sheet ejection section 600, for example, as illustrated in FIG. 1.

Image forming apparatus body 100 is a color image forming apparatus with an intermediate transfer system utilizing electrophotographic process technology. That is, image forming apparatus body 100 forms an image as fellows. Image forming apparatus body 100 primarily transfers toner images of respective colors C, M, Y, and K formed on photoconductors onto an intermediate transfer member, superimposes the toner images of the four colors on one another on the intermediate transfer member, and then secondarily transfers the resultant image to a sheet. Note that C, M, Y, and K respectively represent cyan (C), magenta (M), yellow (Y), and black (K).

Image forming apparatus body 100 employs a tandem system. In the tandem system, the photoconductors respectively corresponding to the four colors of C, M, Y, and K are placed in series in a travelling direction of the intermediate transfer member, and the toner images of the four colors are sequentially transferred onto the intermediate transfer member in one cycle.

Image forming apparatus 1 includes image processing section 10, image forming section 20, fixing section 30, sheet conveyance section 40, communication section 71, storage section 72, control section 200, sheet feeding section 300, buffer section 400, image reading section 500, and sheet ejection section 600, for example, as illustrated in FIG. 2.

Control section 200 includes, for example, central processing unit (CPU) 201, read only memory (ROM) 202, and random access memory (RAM) 203. CPU 201 reads a program according to processing contents from ROM 202, develops the program in RAM 203, and integrally controls an operation of each block of image forming apparatus 1 in cooperation with the developed program. At this time, control section 200 refers to various data, such as a look up table (LUT), stored in storage section 72. Storage section 72 is composed of, for example, a non-volatile semiconductor memory (so-called flash memory) or a hard disk drive.

Control section 200 transmits and receives various data to and from an external apparatus (e.g., a personal computer) connected to a communication network such as a local area network (LAN) or a wide area network (WAN), through communication section 71. Control section 200 receives, for example, image data transmitted from the external apparatus, and forms an image on a sheet based on the image data (the input image data). Communication section 71 is composed of, for example, a communication control card such as a LAN card.

Control section 200 is connected to each of an operation display section (not illustrated), image processing section 10, image forming section 20, fixing section 30, sheet conveyance section 40, communication section 71, storage section 72, sheet feeding section 300, buffer section 400, image reading section 500, and sheet ejection section 600. These connected sections execute predetermined processing based on the instruction of control section 200.

The operation display section includes, for example, a liquid crystal display (LCD) with a touch screen, and functions as a display section and an operation section. The display section displays, for example, various operation screens, image conditions, operation statuses of functions in accordance with display control signals inputted from control section 200. The operation section includes various operation keys such as numeric keys and a start key, receives various operations inputted by a user, and outputs operation signals to control section 200.

Image processing section 10 includes, for example, a circuit that performs image processing according to initial settings or user settings on the input image data. Image forming section 20 is controlled based on the image data subjected to the image processing.

Image forming section 20 includes, for example, image forming units 21 (21Y, 21M, 21C, and 21K), intermediate transfer unit 22, and secondary transfer unit 23. Image forming unit 21Y forms images with a colored toner of a Y component based on the image data from image processing section 10. Likewise, image forming units 21M, 21C, and 21K form images with colored toners of an M component, a C component, and a K component respectively.

Image forming units 21Y, 21M, 21C, and 21K have similar configurations to each other. To be more specific, image forming units 21Y, 21M, 21C, and 21K each include an exposing device, a developing device, a photoconductor drum, a charging device, and a drum cleaning device, for example. Known technologies can be employed for the exposing device, the developing device, the photoconductor drum, the charging device, and the drum cleaning device, and the description thereof is thus omitted.

Intermediate transfer unit 22 includes an intermediate transfer belt and the like. The intermediate transfer belt is stretched around a plurality of support rollers in a loop form, and travels in a direction of arrow A. The support rollers include rollers such as a back-up roller, a primary transfer roller, and a driving roller, although these rollers are not illustrated. The intermediate transfer belt is in pressure contact with the photoconductor drums, and this allows transferring the toner images from the photoconductor drums onto the intermediate transfer belt.

Note that intermediate transfer unit 22 may be configured with a belt cleaning device including, for example, a plate belt cleaning blade that is in sliding contact with the surface of the intermediate transfer belt. The belt cleaning device removes remaining toner on the surface of the intermediate transfer belt after the secondary transfer.

Secondary transfer unit 23 includes a secondary transfer roller and the like. The secondary transfer roller is in pressure contact with the intermediate transfer belt. This allows forming a secondary transfer nip between the intermediate transfer belt and the secondary transfer roller.

When a sheet is conveyed to the secondary transfer nip, toner images of the four colors carried by the intermediate transfer belt are collectively transferred onto the sheet in secondary transfer unit 23. The sheet with the transferred toner images is conveyed toward fixing section 30 by the secondary transfer roller.

Note that, as secondary transfer unit 23, the secondary transfer unit including the secondary transfer roller may be replaced with a secondary transfer unit including a secondary transfer belt stretched around a plurality of support rollers.

Fixing section 30 includes a fixing roller and a pressure roller, for example. The fixing roller is heated to a predetermined fixing temperature, and the pressure roller forms a fixing nip that holds and conveys a sheet with the fixing roller. Fixing section 30 fixes the toner images on the sheet by heating and pressing the conveyed sheet with secondarily transferred toner images at the fixing nip.

Sheet conveyance section 40 includes, for example, sheet feeding conveyance section 41, conveyance path section 42, and sheet ejection conveyance section 43. Sheet feeding conveyance section 41, conveyance path section 42, and sheet ejection conveyance section 43 are composed of a plurality of conveyance rollers and a driving motor to rotate the rollers, for example. Sheet feeding conveyance section 41 conveys a sheet fed out from sheet feeding section 300 to conveyance path section 42. Conveyance path section 42 conveys the sheet to image forming section 20, and an image is formed in image forming section 20. The sheet is subjected to fixing processing in fixing section 30, and then sheet ejection conveyance section 43 conveys the sheet to buffer section 400.

Sheet feeding section 300 is placed on the upstream side of image forming apparatus body 100 in sheet conveyance direction D, which is a direction of conveying sheets, and is connected to image forming apparatus body 100. Sheet feeding section 300 includes a plurality of sheet feeding trays, and the sheet feeding trays store sheets (e.g., standard sheets and special sheets), for each preset type, identified according to the basis weight and size, for example. Sheet feeding section 300 feeds out and provides a sheet to sheet feeding conveyance section 41 of image forming apparatus body 100 based on the instruction of image forming apparatus body 100.

Buffer section 400 is placed on the downstream side of image forming apparatus body 100 in sheet conveyance direction D, and is connected to image forming apparatus body 100. Buffer section 400 is an adjusting device that is provided between image forming apparatus body 100 and image reading section 500, and absorbs a speed difference between a sheet conveyance speed in image forming apparatus body 100 and a sheet conveyance speed in image reading section 500. Note that a similar adjusting device may be provided between sheet feeding section 300 and image forming apparatus body 100. Buffer section 400 is not an essential component, and image reading section 500 may be directly connected to image forming apparatus body 100 without buffer section 400.

Image reading section 500 is placed on the downstream side of buffer section 400 in sheet conveyance direction D, and is connected to buffer section 400. Image reading section 500 includes detection sections 501 and 502 that detect positions of a plurality of adjustment images (see FIG. 4A and FIG. 4B) formed on a sheet by image forming apparatus body 100. Detection section 501 (the first detection section) and detection section 502 (the second detection section) are placed so that detection section 501 reads the adjustment images on a front surface of the sheet being conveyed, and detection section 502 reads the adjustment images on a back surface of the sheet. Note that detection sections 501 and 502 will be described later in detail with reference to FIG. 4A and FIG. 4B. Image reading section 500 is not limited to be used for image alignment with the adjustment images, and is also used for inspection for defects of formed images and various calibrations.

Sheet ejection section 600 is placed on the downstream side of image reading section 500 in sheet conveyance direction D, and is connected to image reading section 500. Sheet ejection section 600 ejects the sheet conveyed from image reading section 500 outside the apparatus, and places the sheet on sheet ejection tray 601.

In image forming apparatus 1, image forming apparatus body 100 aligns images by changing image forming conditions and correcting image forming positions, according to the distance between the ends of the sheet and the positions of the adjustment images read by detection sections 501 and 502.

Incidentally, an image alignment method in a conventional image forming apparatus is based on, for example, a condition where a detection section of an image reading section is wider than a sheet in a direction of the width of the sheet.

Figure 3:
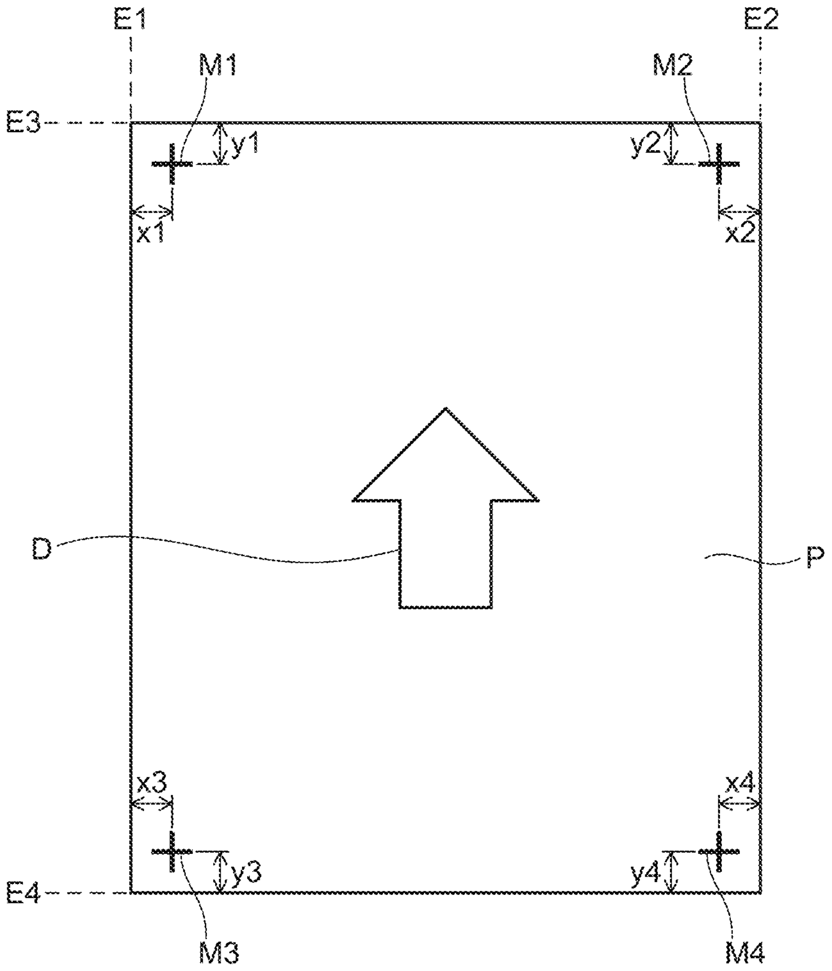
FIG. 3 is a diagram illustrating adjustment images in a conventional image alignment method.

This is because adjustment images for the alignment are formed on four corners of the sheet in the image forming apparatus, in order to align the image. The conventional image alignment method will be described here with reference to FIG. 3. FIG. 3 is a diagram illustrating the adjustment images in the conventional image alignment method.

As illustrated in FIG. 3, adjustment images M1 to M4 used for the image alignment are formed on the four corners of sheet P by the image forming apparatus. At this time, adjustment images M1 to M4 are formed so that distances x1 to x4 are equal to each other. Distances x1 and x3 are distances from sheet end E1 to adjustment images M1 and M3 respectively, and distances x2 and x4 are distances from sheet end E2 to adjustment images M2 and M4 respectively. Also, adjustment images M1 to M4 are formed so that distances y1 to y4 are equal to each other. Distances y1 and y2 are distances from sheet end E3 to adjustment images M1 and M2 respectively, and distances y3 and y4 are distances from sheet end E4 to adjustment images M3 and M4 respectively.

Although the detection section of the image reading section in the conventional image forming apparatus is not illustrated in FIG. 3, the detection section is placed above sheet P so as to read adjustment images M1 to M4 on a front surface of sheet P to be conveyed in sheet conveyance direction (a sub scanning direction) D. In addition, the detection section is wider than sheet P and placed exceeding sheet Pin a direction of the width of sheet P (a main scanning direction).

For sheet P with adjustment images M1 to M4, the conventional image forming apparatus detects distances x1 to x4 and y1 to y4 of adjustment images M1 to M4 with the detection section, and then determines whether the detection results of distances x1 to x4 and y1 to y4 detected by the detection section are each within a predetermined range of a reference value. When the detection result is out of the predetermined range of the reference value, the conventional image forming apparatus changes image forming conditions according to the amount of misalignment from the reference value.

As described above, the conventional image forming apparatus aligns images by forming adjustment images M1 to M4 with different image forming conditions and adjusting image forming positions of adjustment images M1 to M4 so that distances x1 to x4 and y1 to y4 are each within the predetermined range of the reference value. That is, the conventional image forming apparatus aligns images by adjusting the image forming positions of adjustment images M1 to M4 with different image forming conditions so that distances x1 to x4 of adjustment images M1 to M4 are equal to each other and distances y1 to y4 of adjustment images M1 to M4 are also equal to each other.

However, forming the adjustment images on the four corners of the sheet causes the detection section to fail to read part of the adjustment images, for example, in a case where the detection section is narrower than the sheet. In addition, the adjustment images cannot be formed on the four corners of the sheet in some cases due to a restriction on the image forming conditions for the image to be formed on the sheet, depending on requests of users, for example. It is thus expected to adjust the image forming position more flexibly by reading the adjustment images regardless of such restrictions on the width of the detection section and on the image forming conditions.

In the present embodiment, image forming apparatus 1 includes image forming section 20 that forms a plurality of adjustment images to be used for adjusting an image forming position on a sheet, and the plurality of adjustment images are formed at positions that are asymmetrical with respect to the center of the sheet.

Figure 4A:
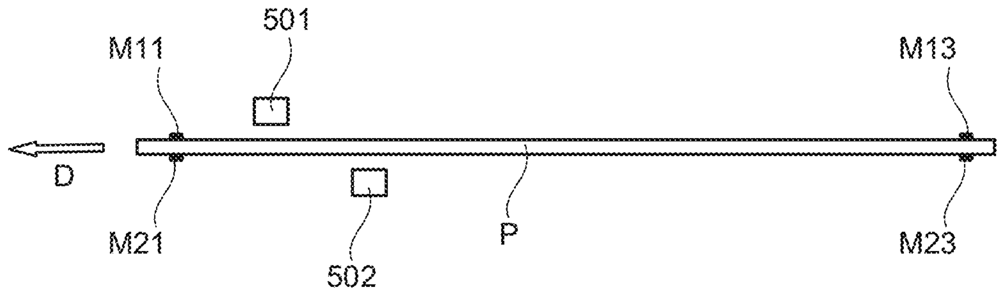
FIG. 4A is a diagram illustrating an image reading section and the adjustment images according to the embodiment of the present invention, viewed from a side of a sheet.

Firstly, detection sections 501 and 502 in image forming apparatus 1 will be described in detail with reference to FIG. 4A and FIG. 4B. Sheet P is conveyed in sheet conveyance direction D, and detection section 501 is placed above sheet P so as to read adjustment images M11 to M14 on a front surface of sheet P. Detection section 502 is placed below sheet P so as to read adjustment images M21 to M24 on a back surface of sheet P. In the present embodiment, detection section 501 is placed on the downstream side of detection section 502 in sheet conveyance direction D, and detection sections 501 and 502 are placed exceeding one end section E1 of sheet P in the sheet width direction.

The width of detection sections 501 and 502 may be equal to or narrower than the width of sheet P in the sheet width direction. In a case where image forming apparatus 1 can convey sheets in a plurality of sizes, the width of detection sections 501 and 502 may be equal to or narrower than the width of largest sheet P available to image forming apparatus 1 in the sheet width direction.

CISs, charge-coupled devices (CCDs), or cameras employing an optical system can be used as such detection sections 501 and 502.

Detection sections 501 and 502 detect positions of end sections E1, E3, and E4 and adjustment images M11 to M14 and M21 to M24, which will be described later, by detecting a variation in the amount of light reflected by sheet P, for example. The amount of reflected light varies for end sections E1, E3, and E4 depending on the presence or absence of sheet P, and the amount of reflected light varies for adjustment images M11 to M14 and M21 to M24 depending on the presence or absence of such images. Detection sections 501 and 502 can thus detect the positions of end sections E1, E3, and E4 and adjustment images M11 to M14 and M21 to M24 by detecting the variation in the amount of such reflected light.

Next, a detail description will be given of adjustment images M11 to M14 and M21 to M24 to be formed by image forming section 20 of image forming apparatus 1 for the image alignment, with reference to FIG. 4B. Note that adjustment images M11 to M14 and M21 to M24 here are cross-shaped, by way of example.

Adjustment images M11 to M14 are formed on the front surface of sheet P at positions that are asymmetrical (not point-symmetrical) with respect to center C of sheet P.

To be more specific, adjustment images M11 and M12 are formed in a pair on the front surface of sheet P at positions that are asymmetrical (not line-symmetrical) with respect to the center position (center line CL1) in the sheet width direction, which is one side direction of sheet P. In addition, adjustment images M13 and M14 are formed in a pair on the front surface of sheet P at positions that are asymmetrical (not line-symmetrical) with respect to above-mentioned center line CL1.

Further, adjustment image M11 is formed on a side of end section E1 from above-mentioned center line CL1 on the front surface of sheet P so that distance x11, from end section E1 to adjustment image M11, is shorter than distance x15, from end section E2 to adjustment image M12. Likewise, adjustment image M13 is formed on the side of end section E1 from above-mentioned center line CL1 on the front surface of sheet P so that distance x13 from end section E1 to adjustment image M13 is shorter than distance x16 from end section E2 to adjustment image M14.

Adjustment images M12 and M14 are formed at positions asymmetric (not line-symmetric) to adjustment images M11 and M13, which are formed at the above-described positions, with respect to above-mentioned center line CL1. More specifically, adjustment image M12 is formed on a side of end section E2 from above-mentioned center line CL1 on the front surface of sheet P so that distance x15 is longer than distance x11. Likewise, adjustment image M14 is formed on the side of end section E2 from above-mentioned center line CL1 on the front surface of sheet P so that distance x16 is longer than distance x13.

Note that, in the present embodiment, adjustment images M11 and M13 are formed in a pair on the front surface of sheet P at positions that are symmetrical (line-symmetrical) with respect to the center position (center line CL2) in the sheet conveyance direction, which is another side direction of sheet P. In addition, adjustment images M12 and M14 are formed in a pair on the front surface of sheet P at positions that are symmetrical (line-symmetrical) with respect to above-mentioned center line CL2.

That is, adjustment images M12 and M14 are not formed on the corners of sheet P at least. Further, adjustment images M11 and M13 are not necessarily formed on the corners of sheet P either.

Adjustment images M11 and M12 are formed within detection range R of sheet P that is detectable by detection section 501, and adjustment images M13 and M14 are also formed within the detection range R.

As described above, adjustment images M11 to M14 are formed at the positions that are asymmetrical (not point-symmetrical) with respect to center C of sheet P, within above-mentioned detection range R. Adjustment images M11 to M14 can be formed at any positions as long as such conditions are satisfied, and users can place (set) adjustment images M11 to M14 at any positions depending on a printing image to be formed on sheet P. For example, the users can freely set the positions of adjustment images M11 to M14 using the operation display section of image forming apparatus 1.

Adjustment images M21 to M24 are formed on the back surface of sheet P in the same manner as adjustment images M11 to M14 described above.

In the present embodiment, the width of detection sections 501 and 502 in the sheet width direction is equal to or narrower than the width of sheet P, and adjustment images M11 to M14 and M21 to M24 are formed within detection range R of sheet P in the sheet width direction, as described above. Thus, adjustment images M11 to M14 and M21 to M24 are detectable without increasing the size of detection sections 501 and 502 (increasing the length in the sheet width direction). In addition, detection sections 501 and 502 can be shorter in the sheet width direction than the detection section of the conventional apparatus disclosed in Japanese Patent Application Laid-Open No. 2000-305324, thereby reducing the apparatus cost as well as miniaturizing detection sections 501 and 502.

Next, an image alignment method using above-described adjustment images M11 to M14 will be described.

For sheet P with adjustment images M11 to M14, image forming apparatus 1 detects distances x11 to x14 and y11 to y14 of adjustment images M11 to M14 with detection section 501.

To be more specific, detection section 501 detects the positions of end section E1 and adjustment image M11, and control section 200 of image forming apparatus 1 calculates distance x11 between end section E1 and adjustment image M11 in the sheet width direction. Also, detection section 501 detects the positions of end section E1 and adjustment image M12, and control section 200 calculates distance x12 between end section E1 and adjustment image M12 in the sheet width direction. Control section 200 calculates distances x11 and x12 from end section E1 to adjustment images M11 and M12 respectively in the sheet width direction, as described above. The same applies to adjustment images M13 and M14.

Additionally, detection section 501 detects the positions of end section E3 (an end section on the downstream side in sheet conveyance direction D) and adjustment image M11, and control section 200 calculates distance y11 between end section E3 and adjustment image M11 in sheet conveyance direction D. Also, detection section 501 detects the positions of end section E3 and adjustment image M12, and control section 200 calculates distance y12 between end section E3 and adjustment image M12 in sheet conveyance direction D. Control section 200 calculates distances y11 and y12 from end section E3 to adjustment images M11 and M12 respectively in sheet conveyance direction D, as described above.

Further, detection section 501 detects the positions of end section E4 (an end section on the upstream side in sheet conveyance direction D) and adjustment image M13, and control section 200 calculates distance y13 between end section E4 and adjustment image M13 in sheet conveyance direction D. Also, detection section 501 detects the positions of end section E4 and adjustment image M14, and control section 200 calculates distance y14 between end section E4 and adjustment image M14 in sheet conveyance direction D. Control section 200 calculates distances y13 and y14 from end section E4 to adjustment images M13 and M14 respectively in sheet conveyance direction D, as described above. Note that distances from end section E3 to adjustment images M13 and M14 may be calculated as is the case with adjustment images M11 and M12, although the distances from end section E4 to adjustment images M13 and M14 are calculated in the present embodiment.

Then image forming apparatus 1 determines whether the detection results of distances x11 to x14 and y11 to y14 detected by detection section 501 are each within a predetermined range of a reference value. When the detection result is out of the predetermined range of the reference value, the image forming conditions are changed according to the amount of misalignment of the detection result from the reference value (i.e., the difference between the detection result and the reference value).

The reference value is specified for each of adjustment images M11 to M14. For example, the reference values for distances x11 and y11 are specified for adjustment image M11. Likewise, the reference values for distances x12 and y12 are specified for adjustment image M12, the reference values for distances x13 and y13 for adjustment image M13, the reference values for distances x14 and y14 for adjustment image M14.

The image forming conditions on the image forming position include, for example, start timings of image formation in the sheet width direction and the sheet conveyance direction. The image forming position is changed by changing the start timings of the image formation.

As described above, adjustment images M11 to M14 are formed by changing the image forming conditions according to the amount of misalignment of the detection results from the reference values. This adjusts the image forming positions of adjustment images M11 to M14 so that distances x11 to x14 and y11 to y14 are each within the predetermined range of the reference value, and images are aligned accordingly.

The image alignment method using adjustment images M11 to M14 has been described, but the same applies to the image alignment method using adjustment images M21 to M24.

The image forming position is changed this way based on the positions (detection results) of adjustment images M11 to M14 formed on the front surface of sheet P. This corrects misalignment in the sheet width direction, the sheet conveyance direction, and the rotation direction, and also corrects magnification in the sheet width direction and the sheet conveyance direction, for an image to be formed on the front surface of sheet P. Likewise, the image forming position is changed based on the positions (detection results) of adjustment images M21 to M24 formed on the back surface of sheet P. This corrects misalignment in the sheet width direction, the sheet conveyance direction, and the rotation direction, and also corrects magnification in the sheet width direction and the sheet conveyance direction, for an image to be formed on the back surface of sheet P.

Note that, in the present embodiment, four adjustment images M11 to M14 are formed on the front surface of sheet P, and four adjustment images M21 to M24 are formed on the back surface of sheet P for the image alignment, but the adjustment images only need to be formed on either the front surface or the back surface of sheet P.

In addition, although adjustment images M11 and M12 are formed in a pair in the sheet width direction, an additional adjustment image may be formed on a line passing through adjustment images M11 and M12 in the sheet width direction. The same applies to the pair of adjustment images M13 and 14, the pair of adjustment images M21 and 22, and the pair of adjustment images M23 and 24.

As described above, image forming apparatus 1 in the present embodiment includes image forming section 20 that forms a plurality of adjustment images M11 to M14 and M21 to M24 used for adjusting the image forming position on sheet P, and the plurality of adjustment images M11 to M14 and M2I to M24 are formed at the positions that are asymmetrical with respect to center C of sheet P.

According to the present embodiment configured in this manner, the plurality of adjustment images M11 to M14 and M21 to M24 are formed at the positions that are asymmetrical with respect to center C of sheet P. Thus, adjustment images M11 to M14 and M21 to M24 are detectable without increasing the size of detection sections 501 and 502 (increasing the length in the sheet width direction). In addition, adjustment images M11 to M14 and M21 to M24 are detectable even in a case where the plurality of adjustment images M11 to M14 and M21 to M24 cannot be formed on the four corners of sheet P due to the image forming conditions of the printing image to be formed on sheet P. The detection of adjustment images M11 to M14 and M21 to M24 formed at desired positions enables more flexible adjustment of the image forming position.

Note that image reading section 500 may be configured with either one of detection sections 501 and 502 although image reading section 500 includes both of detection sections 501 and 502 in the embodiment described above. For example, in a case of a configuration with detection section 501, adjustment images M11 to M14 are formed on the front surface of sheet P. In a case of a configuration with detection section 502, adjustment images M21 to M24 are formed on the back surface of sheet P.

In the embodiment described above, image reading section 500 is configured as an independent device from image forming apparatus body 100, but image reading section 500 may be incorporated in image forming apparatus body 100 and placed between fixing section 30 and sheet ejection conveyance section 43.

<Variation 1>

The present variation will be described with reference to FIG. 4B used above. In the embodiment described above, adjustment images M11 and M13 are formed in a pair at the positions that are symmetrical (line-symmetrical) with respect to center line CL2, and adjustment images M12 and M14 are formed in a pair at the positions that are symmetrical (line-symmetrical) with respect to center line CL2.

In the present variation, in contrast, adjustment images M11 and M13 are formed in a pair at the positions that are asymmetrical (not line-symmetrical) with respect to center line CL2. Adjustment images M12 and M14 are also formed in a pair at the positions that are asymmetrical (not line-symmetrical) with respect to center line CL2.

Adjustment images M21 to M24 are formed on the back surface of sheet P in the same manner as adjustment images M11 to M14 of the present variation.

As described above, the plurality of adjustment images M11 to M14 and M21 to M24 are formed at the positions that are asymmetrical with respect to center C of sheet P in the present variation as well. Thus, it is possible to adjust the image forming position more flexibly by detecting adjustment images M11 to M14 and M21 to M24 formed at desired positions, as in the above embodiment.

<Variation 2>

Figure 4B:
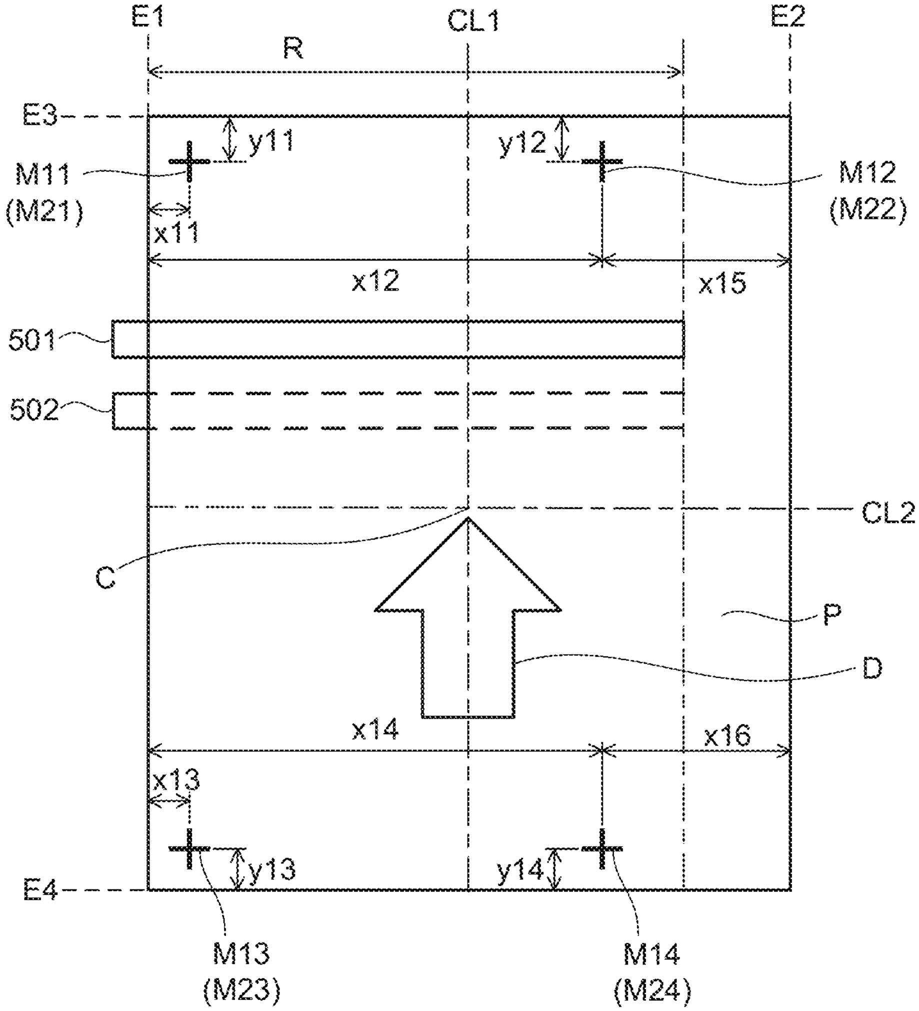
FIG. 4B is a diagram illustrating the image reading section and the adjustment images according to the embodiment of the present invention, viewed from above the sheet.

In the embodiment described above, adjustment images M11 to M14 are formed at the positions that are asymmetrical (not point-symmetrical) with respect to center C of sheet P on the front surface of sheet P, as illustrated in FIG. 4B.

In the present variation, in contrast, adjustment images M11 to M14 are formed at the positions that are asymmetrical (not point-symmetrical) with respect to the center of the printing image to be formed on sheet P, instead of center C of sheet P. Note that FIG. 4B is referred for the following description although FIG. 4B does not include the printing image or the center of the printing image.

To be more specific, adjustment images M11 and M12 are formed in a pair on the front surface of sheet P at positions that are asymmetrical (not line-symmetrical) with respect to a center line of the printing image in the sheet width direction of sheet P (the first image center line). In addition, adjustment images M13 and M14 are formed in a pair on the front surface of sheet P at positions that are asymmetrical (not line-symmetrical) with respect to the first image center line mentioned above.

Further, adjustment image M11 is formed on the side of end section E1 from the above-mentioned first image center line on the front surface of sheet P so that distance x11 is shorter than distance x15. Likewise, adjustment image M13 is formed on the side of end section E1 from the above-mentioned first image center line on the front surface of sheet P so that distance x13 is shorter than distance x16.

Adjustment images M12 and M14 are formed at positions asymmetric (not line-symmetric) to adjustment images M11 and M13, which are formed at the above-described positions, with respect to the above-mentioned first image center line. More specifically, adjustment image M12 is formed on the side of end section E2 from the above-mentioned first image center line on the front surface of sheet P so that distance x15 is longer than distance x11. Likewise, adjustment image M14 is formed on the side of end section E2 from the above-mentioned first image center line on the front surface of sheet P so that distance x16 is longer than distance x13.

Note that adjustment images M11 and M13 are formed in a pair on the front surface of sheet P at positions that are symmetrical (line-symmetrical) with respect to a center line of the printing image in the sheet conveyance direction of sheet P (the second image center line). Alternatively, adjustment images M11 and M13 may be formed in a pair on the front surface of sheet P at positions that are asymmetrical (not line-symmetrical) with respect to the second image center line mentioned above.

Likewise, adjustment images M12 and M14 are formed in a pair on the front surface of sheet P at positions that are symmetrical (line-symmetrical) with respect to the above-mentioned second image center line. Alternatively, adjustment images M12 and M14 may be formed in a pair on the front surface of sheet P at positions that are asymmetrical (not line-symmetrical) with respect to the above-mentioned second image center line.

That is, adjustment images M12 and M14 are not formed on the corners of sheet P at least. Further, adjustment images M11 and M13 are not necessarily formed on the corners of sheet P either.

Adjustment images M11 and M12 are formed within detection range R of sheet P that is detectable by detection section 501, and adjustment images M13 and M14 are also formed within the detection range R.

As described above, adjustment images M11 to M14 are formed at the positions that are asymmetrical (not point-symmetrical) with respect to the center of the printing image to be formed on sheet P, within above-mentioned detection range R. Adjustment images M11 to M14 can be formed at any positions as long as such conditions are satisfied, and users can place (set) adjustment images M11 to M14 at any positions depending on the printing image to be formed on sheet P.

Adjustment images M21 to M24 are formed on the back surface of sheet P in the same manner as adjustment images M11 to M14 of the present variation.

As described above, the plurality of adjustment images M1I to M14 and M21 to M24 are formed at the positions that are asymmetrical with respect to the center of the printing image to be formed on sheet P, in the present variation. Thus, it is possible to adjust the image forming position more flexibly by detecting adjustment images M11 to M14 and M21 to M24 formed at desired positions, as in the above embodiment.

<Variation 3>

In the embodiment described above, adjustment images M11 to M14 and M21 to M24 are cross-shaped images. In the present variation, in contrast, some of the adjustment images are different in shape or size from the cross-shaped adjustment image.

Figure 5:
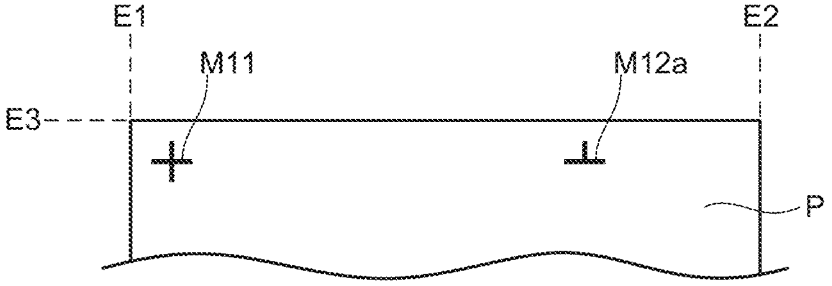
FIG. 5 is a diagram illustrating an exemplary variation of the adjustment images illustrated in FIG. 4B.

FIG. 5 is a diagram illustrating an exemplary variation of the adjustment images illustrated in FIG. 4B. In FIG. 5, adjustment image M11 has a cross shape and adjustment image M12*a* has a shape different from the cross shape. In this way, at least two adjustment images, e.g., a pair of the adjustment images, on sheet P are formed differently. Such adjustment images may be different in shape or size, for example. The shape or size of the adjustment images can be freely set by users, for example, using the operation display section of image forming apparatus 1.

As described above, at least one of the shape and the size is different in at least two adjustment images among the plurality of adjustment images in the present variation.

According to the present variation configured in this manner, at least one of the shape and the size is different in at least two adjustment images among the plurality of adjustment images, and thus the shape or the size of the adjustment images can be changed, for example, according to the image forming conditions or requests from the users. The detection of adjustment images M11 to M14 and M21 to M24 formed in desired shape or size at desired positions enables more flexible adjustment of the image forming position.

Note that any of the embodiment described above merely illustrates one example of embodiment for carrying out the present invention, and the technical scope of the present invention shall not be construed in a limited manner thereby. That is, the present invention can be carried out in various forms without deviating from the gist or essential characteristics of the present invention.

Although embodiments of the present invention have been described and illustrated in detail, the disclosed embodiments are made for purpose of illustration and example only and not limitation. The scope of the present invention should be interpreted by terms of the appended claims.

What is claimed is:

1. An image forming apparatus, comprising:
an image former that forms a plurality of adjustment images on a sheet, the plurality of adjustment images being for aligning a printing image by adjusting a forming position of the printing image according to distances between ends of the sheet and positions of the plurality of adjustment images, wherein the plurality of adjustment images are formed at positions that are asymmetrical with respect to a center of the sheet;
a detector disposed to stride over one end of a pair of ends and not to stride over another end of the pair of the ends, the pair of the ends being along a conveyance direction of the sheet, the detector configured to detect a position of the one end and a plurality of adjustment image positions, one for each of the plurality of adjustment images formed in a direction orthogonal to the conveyance direction on the sheet; and
a control section configured to calculate each distance from the position of the one end to each of the plurality of adjustment image positions,
wherein the image former adjusts the forming position of the printing image based on the calculated distances.

2. The image forming apparatus according to claim 1, wherein the plurality of adjustment images are formed at positions that are asymmetrical with respect to a center position in a direction of one side of the sheet.

3. The image forming apparatus according to claim 2, wherein the plurality of adjustment images are formed in a pair with respect to the center position.

4. The image forming apparatus according to claim 2, wherein the direction of one side is at least one of a direction of a width of the sheet and a direction of conveying the sheet.

5. The image forming apparatus according to claim 1, wherein the plurality of adjustment images are formed at positions set by a user.

6. The image forming apparatus according to claim 1, wherein at least two of the plurality of adjustment images are in different forms.

7. The image forming apparatus according to claim 1, wherein the plurality of adjustment images are formed in a form set by a user.

8. The image forming apparatus according to claim 1, wherein the detector performs detection of positions of the plurality of adjustment images, and has a detection range equal to or narrower than a width of the sheet in a direction of the width of the sheet.

9. The image forming apparatus according to claim 8, wherein:
the detector performs the detection of the positions of the plurality of adjustment images formed on a front surface or a back surface of the sheet, and
the image former changes the forming position of the printing image on the front surface or the back surface of the sheet according to a result of the detection by the detector.

10. The image forming apparatus according to claim 8, wherein:
the detector comprises:
a first detector that performs the detection of the positions of the plurality of adjustment images formed on a front surface of the sheet; and
a second detector that performs the detection of the positions of the plurality of adjustment images formed on a back surface of the sheet, and
the image former changes the forming position of the printing image on the front surface of the sheet according to a result of the detection by the first detector, and changes the forming position of the printing image on the back surface of the sheet according to a result of the detection by the second detector.

* * * * *